United States Patent [19]
Ito et al.

[11] 3,807,753
[45] Apr. 30, 1974

[54] HYDROPNEUMATIC SUSPENSION UNIT

[75] Inventors: Naganori Ito; Hiroshi Aikawa, both of Tokyo, Japan

[73] Assignee: Nissan Motor Company, Yokohama, Japan

[22] Filed: Dec. 26, 1972

[21] Appl. No.: 315,435

[30] Foreign Application Priority Data
Dec. 24, 1971 Japan.............................. 46/6121622
Jan. 12, 1972 Japan.............................. 47/475229

[52] U.S. Cl............................. 280/124 F, 267/64 R
[51] Int. Cl.............................................. B60g 11/28
[58] Field of Search................ 280/124 F, 6 R, 6 H; 267/64 R, 64 A, 64 B, 65 D

[56] References Cited
UNITED STATES PATENTS
3,088,725    5/1963    Dangauthier.................... 280/124 F
3,480,269   11/1969    Jewell............................... 267/64 R
3,525,513    8/1970    Jewell............................... 267/64 R

*Primary Examiner*—Philip Goodman

[57] ABSTRACT

A hydropneumatic suspension unit adapted for automatically adjusting the level of a vehicle body to a substantially constant value relative to ground irrespective of the weight and load of the vehicle. The hydropneumatic suspension unit is provided with a vehicle level adjusting device having inlet and outlet valves to selectively open and close an inlet and an outlet, respectively, of a cylinder chamber thereby to maintain the volume of the cylinder chamber at a predetermined value. The inlet and outlet valves are provided in a cylinder head of the suspension unit parallel to each other and have poppet valves, respectively, which are subjected at their opposite ends to a hydraulic fluid pressure in the cylinder chamber.

13 Claims, 6 Drawing Figures

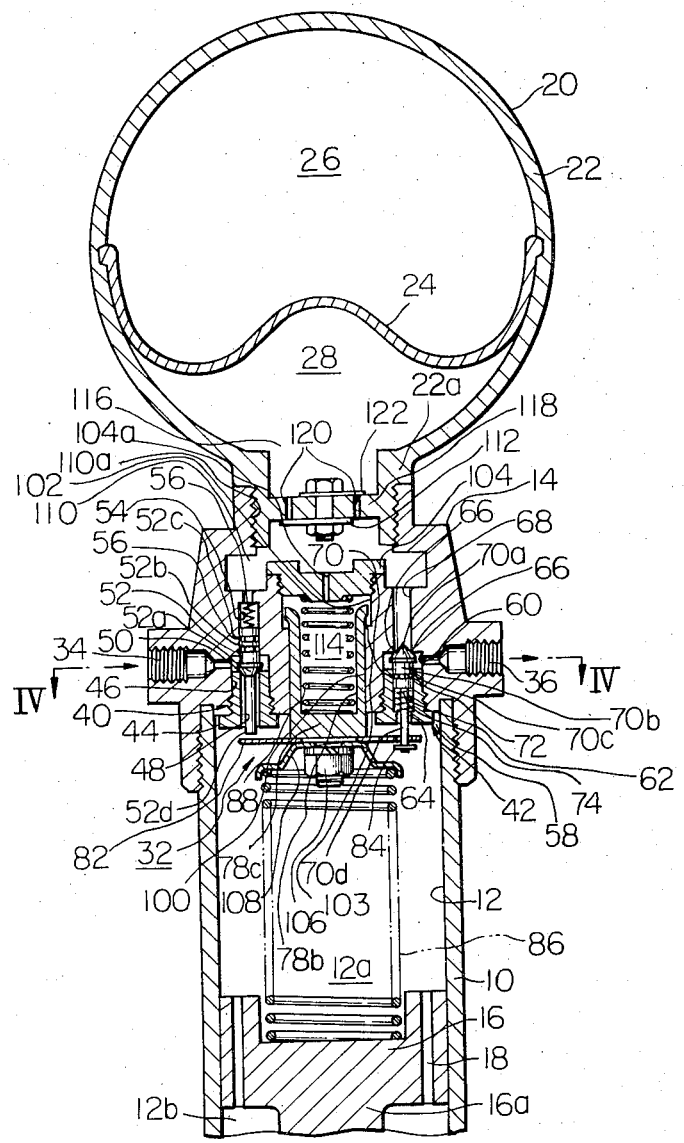

HYDROPNEUMATIC SUSPENSION UNIT

This invention relates in general to suspension units for a wheeled vehicle and, more particularly, to hydropneumatic suspension unit adapted for automatically adjusting the level of the vehicle in relation to ground independently of the weight and load of the vehicle.

A known hydropneumatic suspension unit employed in a wheeled vehicle usually includes a cylinder having a cylinder chamber filled with hydraulic fluid under pressure, a cylinder head formed with fluid inlet and outlet ports, and a piston slidably accommodated in the cylinder chamber. The cylinder is mounted on a vehicle body whereas the piston is mounted through its rod on a wheel supporting means such as an axle. These parts are so arranged as to maintain the effective length of the hydropneumatic suspension unit substantially constant irrespective of the weight and load of the vehicle. This is attained by controlling fluid communication between the cylinder chamber and either the inlet or the outlet port. To this end, the hydropneumatic suspension unit is equipped with a vehicle level adjusting device including a valve spool which is slidably received in an axial bore formed in the cylinder head. The valve spool is normally held in its neutral or equilibrium condition by means of a set of two springs and is movable to different positions to selectively open and close the inlet and outlet ports formed in the cylinder head. With this construction, oil leakage occurs between the valve spool and the axial bore in which the valve spool is slidably accommodated. The oil leakage is disadvantageous in that hydraulic fluid leaks from the cylinder chamber into the outlet port and, consequently, the total length of the hydropneumatic suspension unit is reduced to cause difficulty in maintaining the effective length of the hydropneumatic suspension unit substantially constant especially when the oil pump leading to the inlet port is not operated.

In order to solve these problems, it has heretofore been proposed to have the vehicle level adjusting device equipped with poppet type inlet and outlet valves which are actuated by a floating piston adapted to be movable in the cylinder with respect to to the cylinder head of the hydropneumatic suspension unit. These inlet and outlet valves have valve surfaces, respectively, which are exposed to a variable hydraulic fluid pressure in the cylinder chamber of the hydropneumatic suspension unit. Consequently, it is required that springs acting on the valve heads should have a large magnitude of spring force, respectively, in order to maintain the valves in their closed conditions. This is reflected by the fact that a vehicle level detecting spring, which is located between the floating piston and the piston mounted through its rod on the vehicle supporting means, is selected so as to have a large magnitude of spring force. Thus, the hydropneumatic suspension unit will be inevitably large sized. Various attempts have been made to overcome these drawbacks, but it is quite difficult to provide a compact and endurable hydropneumatic suspension unit due to inherent construction of the vehicle level adjusting device incorporated therein.

It is, therefore, an object of the present invention to provide a hydropneumatic suspension unit for a wheeled vehicle which is adapted to overcome the above-mentioned shortcomings encountered in the prior art devices.

Another object of the present invention is to provide a hydropneumatic suspension unit for a wheeled vehicle which is arranged to operate to adjust the body structure of the vehicle to a substantially constant level irrespective of the weight and load of the vehicle.

Another object of the present invention is to provide a hydropneumatic suspension unit for a wheeled vehicle which is adapted to operate without causing significant fluid consumption due to irregularities of the road surface.

Another object of the present invention is to provide an improved hydropneumatic suspension unit for a wheeled vehicle which is adapted to be mounted between a vehicle underbody structure and a wheel supporting means such as an axle.

Another object of the present invention is to provide a hydropneumatic suspension unit for a wheeled vehicle which is compact in construction and easy to assemble.

Another object of the present invention is to provide a hydropneumatic suspension unit having a novel vehicle level adjusting device which operates highly reliably without causing excessive fluid consumption.

Another object of the present invention is to provide a hydropneumatic suspension unit having a novel vehicle level adjusting device which is adapted to minimize oil leakage from the cylinder chamber of the hydropneumatic suspension unit.

Still another object of the present invention is to provide a hydropneumatic suspension unit having a novel vehicle level adjusting device by which the effective length of the hydropneumatic suspension unit is kept at a substantially constant level at all times even when an oil pump serving as a source of hydraulic fluid under pressure is not operated.

A further object of the present invention is to provide a hydropneumatic suspension unit having a novel vehicle level adjusting device which is simple in construction and economical to manufacture.

A still further object of the present invention is to provide a hydropneumatic suspension unit having a vehicle level adjusting device provided with inlet and outlet valves of the poppet-type which operate highly reliably for controlling fluid communication between the cylinder chamber of the hydropneumatic suspension unit and either a hydraulic fluid inlet or an outlet of the cylinder chamber.

A still further object of the present invention is to provide a hydropneumatic suspension unit having a vehicle level adjusting device provided with poppet-type inlet and outlet valves which are adapted to minimize oil leakage from the cylinder chamber of the hydropneumatic suspension unit.

A yet further object of the present invention is to provide a hydropneumatic suspension unit having a vehicle level adjusting device provided with poppet-type inlet and outlet valves by which the effective length of the hydropneumatic suspension unit is maintained at a substantially constant level at all times even when an oil pump serving as a source of hydraulic fluid under pressure is inoperative.

A yet further object of the present invention is to provide a hydropneumatic suspension unit having a vehicle level adjusting device provided with poppet-type inlet and outlet valves which are located parallel to each other in a cylinder head of the hydropneumatic suspension unit whereby the total length of the hydropneumatic suspension unit is shortened.

A yet still further object of the present invention is to provide a hydropneumatic suspension unit having a vehicle level adjusting device provided with poppet-type inlet and outlet valves which are adapted to be easily operable by movement of a floating piston.

These and other objects and advantages of the present invention will become more apparent from the following description when taken in conjunction with the accompanying drawings in which:

FIG. 3 is a cross-sectional view of another preferred embodiment of a hydropneumatic suspension unit according to the present invention;

Figure 1:
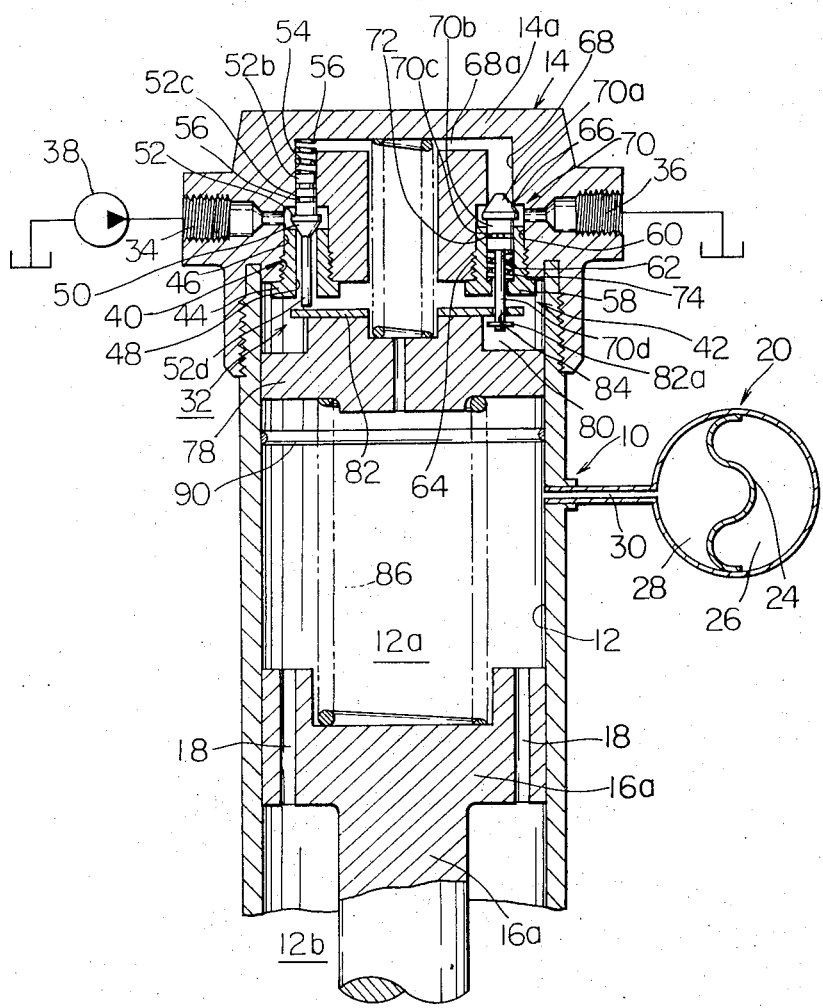
FIG. 1 is a cross-sectional view of a preferred embodiment of a hydropneumatic suspension unit according to the present invention.

Referring now to FIG. 1, there is shown in section a preferred embodiment of the hydropneumatic suspension unit implementing the present invention. The present invention proposes a hydropneumatic suspension unit specifically suited for use in a wheeled vehicle between a vehicle underbody structure and a wheel supporting means such as an axle to maintain the vehicle level at a substantially constant level irrespective of the weight and load of the vehicle. In FIG. 1, the hydropneumatic suspension unit comprises a cylinder body 10 having a cylinder chamber 12 formed therein. The cylinder body 10 is shown as screwed at its upper end into a cylinder head 14 having an end wall 14a. The cylinder head 14 may be mounted on the vehicle underbody structure (not shown). A main piston 16 is axially slidably accommodated in the cylinder chamber 12 and divides the cylinder chamber 12 into upper and lower compartments 12a and 12b which are filled with hydraulic fluid such as an oil as will be subsequently described in detail. The main piston 16 has a piston rod 16a which extends outwardly of the cylinder chamber 12, though not shown. This piston rod 16a has formed at its lowermost end a mounting eye (not shown) through which the piston rod 16a is connected to the wheel supporting means such as an axle (not shown). A generally axially extending passage or passages 18 are formed in the piston 16 to provide fluid communication across the main piston 16, viz., between the upper and lower compartments 12a and 12b, respectively. The passage or passages 18 are intended to permit the hydraulic fluid in the two compartments 12a and 12b to flow from one to the other of these compartments so as to dampen the vertical shocks transferred to the suspension unit from the vehicle supporting wheels.

Generally designated by reference numeral 20 is a hydropneumatic spring unit which serves to dampen or absorb and desorb changes in the pressure or volume level of the hydraulic fluid in the cylinder chamber 12 due to relative movements of the cylinder body 10 and the piston 16 caused by irregularities of the road surface on which the vehicle travels. As shown, the hydropneumatic spring unit 20 includes a casing 22 which is internally divided by a flexible partition member 24 into separate chambers 26 and 28. The chamber 26 is totally closed by the flexible partition member 24 and is filled with a compressible gas such as nitrogen gas under pressure. The other chamber 28 communicates with the cylinder chamber 12 through a passage 30. The chamber 28 is thus filled with hydraulic fluid from the cylinder chamber 12.

As shown in FIG. 1, the hydropneumatic suspension unit is provided with a vehicle level adjusting device which is generally indicated by reference numeral 32. The vehicle level adjusting device 32 includes a hydraulic fluid inlet 34 and an outlet 36, which are formed in the cylinder head 14 and which extend radially, respectively. The hydraulic fluid inlet 34 is hydraulically connected to a source of hydraulic fluid under pressure such as a hydraulic fluid pump 38 and communicates with the cylinder chamber 12 through a hydraulic fluid inlet valve 40, while the hydraulic fluid outlet 36 is hydraulically connected to a suitable hydraulic fluid reservoir (not identified) and communicates with the cylinder chamber 12 through a hydraulic fluid outlet valve 42.

According to one feature of the present invention, the hydraulic fluid inlet and outlet valves 40 and 42 are arranged parallel to each other in the cylinder head 14 of the hydropneumatic suspension unit so that the total required length of the suspension unit is shortened.

The hydraulic fluid inlet valve 40 comprises a sleeve 44 which is screwed into an axial bore 46 formed in the cylinder head 14 so as to communicate with the hydraulic fluid inlet 34. The sleeve 44 is formed with an axially extending hydraulic fluid passageway 48 providing fluid communication between the hydraulic fluid inlet 34 and the cylinder chamber 12, and a valve seat 50 on the upper end of the sleeve 44. The hydraulic fluid inlet valve 40 further comprises a poppet valve 52 having a conical valve 52a engageable with the valve seat 50 formed on the sleeve 44, and a valve stem 52b which projects upwardly from the poppet valve 52 and which is axially slidably disposed in an axial bore 54 formed in the cylinder head 14. The valve stem 52b is formed with an annular recess 52c in which a sealing member 56 is located. It is to be noted that the axial bore 54 and the hydraulic fluid passageway 48 are axially aligned with each other so as to cause the poppet valve 52 to completely close the fluid passageway 48 when the valve head 52a engages the valve seat 50. The poppet valve 52 has also a push rod 52d which projects downwardly from the conical valve head 52a and which is axially movably inserted in the hydraulic fluid passageway 48. Thus push rod 52d serves in a manner as will be subsequently explained in detail hereinafter. Indicated at 56 is a compression spring which is positioned in the axial bore 54 formed in the cylinder head 14 and which biases the poppet valve head 52a downwardly of the drawing, viz., to a position in which the conical head 52a engages the valve seat 50 to close the hydraulic fluid passageway 48.

The hydraulic fluid outlet valve 42 comprises a sleeve 58 which is screwed into an axial bore 60 formed in the cylinder head 14 in parallel with the axial bore 46 of the hydraulic fluid inlet valve 40. The sleeve 58 is formed with axially extending coaxial bores 62 and 64.

The hydraulic fluid outlet valve 42 also comprises a valve seat 66 formed in the cylinder head 14 at one end of a hydraulic fluid passageway 68 formed in the cylinder head 14. The hydraulic fluid passageway 68 communicates with a radially extending bore 68a, which, in turn, communicates with the cylinder chamber 12 through an axially extending center bore 69 formed in the cylinder head 14. The hydraulic fluid outlet valve 42 further comprises a poppet valve 70 having a conical valve head 70a engageable with the valve seat 66 and a valve stem 70b slidably received in the axial bore 62 formed in the sleeve 58. The valve stem 70b is formed at its circumference with an annular recess 70c in which a seal member 72 is located. The poppet valve 70 has also a pull rod 70d which projects from the lowermost end of the valve stem 70b and extends through the axial bores 62 and 64 of the sleeve 58. A compression spring 74 is disposed in the axial bore 64 and biases the poppet valve head 70a upwardly of the drawing, viz., to a position in which the conical valve head 70a engages the valve seat 66 formed in the cylinder head 14.

Figure 2:
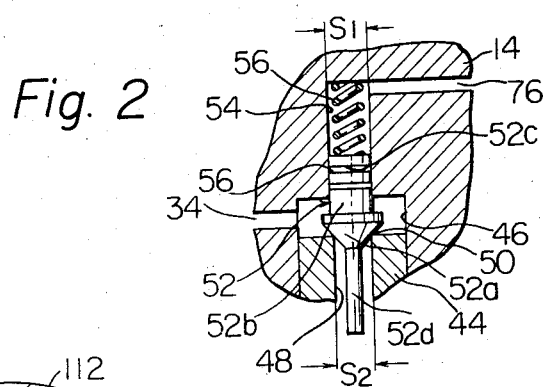
FIG. 2 is an enlarged fragmentary cross-sectional view illustrating a part of the hydropneumatic suspension unit shown in FIG. 1.

According to another feature of the present invention, the hydraulic fluid inlet and outlet valves 40 and 42 are so constructed that the valve heads 62a and 70a of the poppet valves forming part of the inlet and outlet valves are exposed at their both ends to the hydraulic fluid under pressure in the cylinder chamber 12 whereby each poppet valve head is easily movable since the forces of the biasing springs 56 and 74 are relatively small. This provides advantages in that the hydropneumatic suspension unit can be constructed compactly. To this end, the cylinder head 14 is formed with a radially extending bore 76 which provides fluid communication between the axially extending bore 54 of the inlet valve 40 and the axially extending center bore 69 communicating with the cylinder chamber 12. Thus, the hydraulic fluid from the cylinder chamber 12 is admitted not only to the axially extending hydraulic fluid passageway 48 but also the axial bore 54 so that the poppet valve 52 is subjected to the hydraulic fluid pressure at its conical valve head 52a and at an upper surface of the valve stem 52b. As best seen in FIG. 2, the sectional area $S_1$ of the axial bore 54 is preferably selected to be equal to the sectional area $S_2$ of the axially extending hydraulic fluid passageway 48 so that the forces caused by the hydraulic pressure and acting on the poppet valve head 52a in opposite directions balance each other. Since, as previously noted, the sleeve 58 of the outlet valve 42 has formed therein the axial bore 64, the hydraulic fluid is admitted to the axial bore 62 and acts on the lower surface of the valve stem 70b and thus on the vlave head 72a, whereas the conical valve head 70a of the poppet valve 70 is also subjected to the hydraulic fluid pressure admitted from the cylinder chamber 12 through the center bore 69 and the hydraulic fluid passageways 68a and 68. Thus, the forces acting on the poppet valve 70 in opposite directions due to the hydraulic fluid pressure balance each other. Preferably, the sectional area of the axial bore 62 is sized to be equal to the sectional area of the hydraulic fluid passageway 68 for the reason already mentioned hereinabove.

The inlet and outlet valves 40 and 42 are actuated through their respective poppet valves 52 and 70 by a floating piston 78 for opening and closing the hydraulic fluid passageways 48 and 68, respectively. In the illustrated embodiment of FIG. 1, the floating piston 78 is shown as being slidably received in the cylinder chamber 12 but may be disposed in the center bore 69 formed in the cylinder head 14, if desired. A piston chamber 80 is defined by an upper surface of the floating piston 78 and a lower surface of the cylinder heat 14. The floating piston 78 is formed with a restricted flow passage 78a extending therethrough to provide fluid communication between the piston chamber 80 and the upper compartment 12a. The restricted flow passage 78a thus permits flow of hydraulic fluid into the piston chamber 80 from the upper compartment 12a of the cylinder chamber 12 for precluding objectionable movements of the floating piston 78 due to relative motions of the cylinder body and the main piston 16 caused by irregularities on the road surface over which the vehicle travels. Moreover, hydraulic fluid delivered from the inlet 34 is passed into the upper compartment 12a of the cylinder chamber 12 through the restricted flow passage 78a of the floating piston 78 when the inlet valve 40 is open. Excessive hydraulic fluid in the upper compartment 12a of the cylinder chamber 12 and the hydropneumatic spring unit 20 is drained through the restricted flow passage 78a of the floating piston 78 into the outlet 36 when the outlet valve 42 is open.

In FIG. 1, a valve actuating member 82 in the form of an annular plate is secured to the upper end of the floating piston 78 so that the annular plate 82 is movable with the floating piston 78. The annular plate 82 is arranged to abut against the lower end of the push rod 52d of the poppet valve 52 for opening the hydraulic fluid passageway 48 when the floating piston 78 is moved upwardly and to pull the pull rod 70d of the poppet valve 70 for opening the hydraulic fluid passageway 68 when the floating piston is moved downwardly. As shown in FIG. 1, the annular plate 82 has formed therein a hole 82a, through which a portion of the pull rod 70d extends. Indicated at 84 is a snap or retaining ring which is secured to the lower end of the pull rod 70d so that when the floating piston 78 is moved downwardly, the annular plate 82 abuts against the snap ring 84 to cause the pull rod 70d to move downwardly to open the poppet valve 70 and the hydraulic fluid passageway 68.

As shown in FIG. 1, a first compression spring 86 is disposed in the cylinder chamber 12 between the floating piston 78 and the main piston 16 for biasing the floating piston 78 to a first adjusting position, viz., to a position in which the inlet valve 40 is opened while the outlet valve 42 is closed. More specifically, the compression spring 86 engages at its upper end the lower surface of the floating piston 78 and engages at its lower end the upper surface of the main piston 16. A second compression spring 88 is disposed in the center bore 69 formed in the cylinder head 14 for biasing the floating piston 78 to a second adjusting position, viz., to a position in which the inlet valve 40 is closed while the outlet valve is opened. To this end, the second compression spring 88 engages at its upper end the end wall 14a of the cylinder head 14 and at its lower end the upper surface of the floating piston 78. The forces of the first and second compression springs 86 and 88 are so selected as to cause the floating piston 78 to remain in a third or neutral position in which the inlet and outlet valves 40 and 42 are closed by the compression springs 56 and 62 of their respective poppet valves.

Designated by reference numeral 90 is a stop which is fixed in the cylinder chamber 12 for preventing excessive downward movement of the floating piston 78.

As previously mentioned, the hydropneumatic suspension unit thus constructed is adapted to be mounted between the vehicle underbody structure and the wheel supporting means such as an axle.

Normally, the effective length of the hydropneumatic suspension unit is maintained at a substantially constant value irrespective of the weight and load of the vehicle. The hydropneumatic suspension unit assumes the position shown in FIG. 1 in which the body of the vehicle is maintained at a predetermined level relative to ground and in which the pressure and total volume of the hydraulic fluid in the cylinder chamber 12 and the hydropneumatic spring 20 are sufficient to support the weight and load of the vehicle.

When the vehicle is in motion and its load and weight are constant, inequalities in the road surface over which the vehicle is travelling cause relative movement between the vehicle underbody structure and the wheel supporting means which are accompanied by relative axial movement between the cylinder body and the main piston resulting in pressure and volume variations of the hydraulic fluid in the cylinder chamber 12. In this condition, the volume in the cylinder chamber 12 fluctuates and the pneumatic spring unit 20 absorbs or desorbs the fluctuating amount of the hydraulic fluid through the passage 30 into and out of the fluid chamber 28 with the result that the gas in the gas chamber 26 is compressed or expanded to compensate for the volume variations of the hydraulic fluid in the cylinder chamber 12. The pressure in the upper compartment 12a of the cylinder chamber 12 is dampended by means of the passage or passages 18 formed in the main piston 16. Under this condition, the floating piston 78 is maintained substantially stationary relative to the cylinder head 14 because of the restricted flow of hydraulic fluid through the passage 78a of the floating piston 78 and because of opposing forces of the first and second compression springs 86 and 88 so that the inlet and outlet passageways 48 and 68 are closed by the inlet and outlet valves 40 and 42, respectively.

If the load of the vehicle is increased, the hydropneumatic suspension unit is compressed with the cylinder body 10 moved downwardly, that is, toward the axle. This causes the floating piston 78 to move upwardly, that is, to its first regulating position by the action of the first compression spring 86 against the force of the second compression spring 88. When this occurs, the annular plate 82 secured to the floating piston 78 is brought into abutting engagement with the push rod 52d thereby moving the poppet valve head 52a upwardly. Consequently, the conical valve head 52a of the poppet valve 72 disengages the valve seat 50 formed on the sleeve 44 so that the inlet passageway 48 is opened to pass hydraulic fluid from the inlet 34 to the piston chamber 80. The hydraulic fluid admitted to the piston chamber 80 is then partly delivered through the restricted passageway 78a of the floating piston 78 into the upper compartment 12a of the cylinder chamber 12. The hydraulic fluid under pressure thus admitted to the upper compartment 12a of the cylinder chamber 12 then acts on the main piston 16 to extend the hydropneumatic suspension unit with the cylinder body 10 move upwardly, that is, away from the axle until the floating piston is brought into the balanced position as shown in FIG. 1. Under this condition, the effective length of the hydropneumatic suspension unit is increased to its predetermined value in which the body of the vehicle is maintained at its predetermined level relative to ground.

If, on the contrary, the load of the vehicle is decreased, the cylinder body 10 is moved upwardly away from the axle so that the total length of the hydropneumatic suspension unit is increased. In this condition, the floating piston 78 is moved downwardly, that is, to the second adjusting position by the action of the second compression spring 88 against the force of the first compression spring 86. The annular plate 82 secured to the floating piston 78 is caused to abut on the snap ring 84 thereby moving the poppet valve head 70a downwardly. Accordingly, the conical valve head 70a of the poppet valve 70 disengages the valve seat 66 formed in the cylinder head 14 so that the outlet passageway 68 is opened. Under this circumstance, the hydraulic fluid in the piston chamber 80 and the upper compartment 12a of the cylinder chamber 12 is passed through the center bore 69 and the outlet passageway 68 into the outlet 36, through which the hydraulic fluid is drained off. The cylinder body 10 is thus permitted to move downwardly and, therefore, the effective length of the hydropneumatic suspension unit is reduced until the floating piston 78 is moved to its balanced position shown in FIG. 1. Thus, the body of the vehicle is returned to the predetermined level as already described hereinabove.

It should be understood from the foregoing description that when the floating piston 78 of the vehicle level adjusting device 32 assumes its balanced position, the outlet passageway 68 is completely shut off by the conical valve head 70a of the poppet valve 70 engaging the valve seat 66 formed in the cylinder head 14 and, therefore, oil leaks from the cylinder chamber 12 into the outlet 36 are minimized whereby the effective length of the hydropneumatic suspension unit is maintained at a predetermined value at all times even when the hydraulic pump 38 leading to the inlet 34 is not operated. Also, the forces acting on each poppet valve head in opposite directions due to the hydraulic fluid under pressure are determined to be equal to each other so that each poppet valve head is quickly movable by the action of the floating piston 78 through the valve actuating member.

Figure 4:
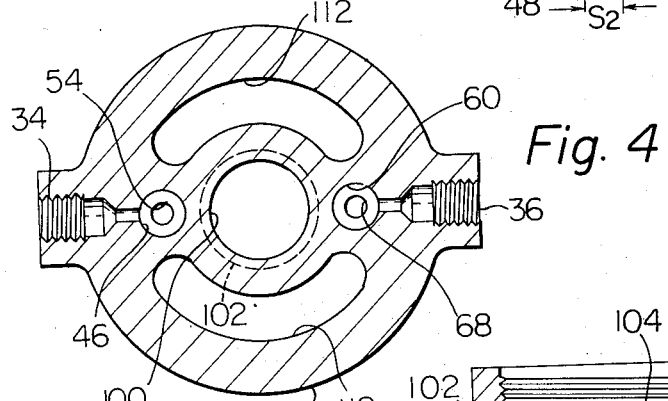
FIG. 4 is a sectional view taken on line IV — IV of FIG. 3.

Another preferred embodiment of the hydropneumatic suspension unit according to the present invention is illustrated in FIGS. 3 and 4, in which like or corresponding component parts are designated by the same reference numerals. In the illustrated embodiment of FIGS. 3 and 4, the floating piston 78 is arranged in the cylinder head 14 parallel to the inlet and outlet valves 40 and 42. To this end, the cylinder head 14 is formed with axially aligned stepped bores 100 and 102, between which an annular shoulder 103 is formed which functions in a manner similar to the stop 90 shown in FIG. 1. The bore 102 is closed by an end plug 104 having formed therein a restricted flow passage 104a. The floating piston 78 is slidably disposed in the bore 100. The floating piston 78 has formed therein a blind bore 78b in which the second compression spring 88 is disposed. The second compression spring 88 engages at its upper end the lower surface of the end plug 104 and engages at its lower end an end wall 78c of the blind bore 78b. As seen in FIG. 3, the upper end portion of the floating piston 78 is radially outwardly bent to form a flange so that the upper end portion of the floating piston 78 engages the annular shoulder 103 formed between the bores 100 and 102 for thereby preventing excessive downward movement of the floating piston 78. As shown, the valve actuating member or the annular plate 82 is secured to the lower end of the floating piston 78 by a suitable fastener means such as a bolt and a nut 106. A spring seat 108 is also fixed to the lower end of the floating piston 78 by the bolt and nut 106 to support the upper end of the first compression spring 86.

In the illustrated embodiment of FIGS. 3 and 4, the cylinder head 14 is also formed with a fluid chamber 110, which communicates with the upper compartment 12a of the cylinder chamber 12 through an arcuate elongate passage or passages 112 (see FIG. 4) formed in the cylinder head 14. The fluid chamber 110 communicates with the outlet passageway 68 and the axial bore 54 of the inlet valve 40. This fluid chamber 110 also communicates through the restricted flow passage 104a of the end plug 104 with a piston chamber 114 defined between the end plug 104 and the floating piston 78. In this illustrated embodiment, the hydropneumatic spring unit 20 is shown as being mounted on the cylinder head 14. More specifically, the casing 22 of the hydropneumatic spring unit 20 is formed with a projection 22a, which is screwed into an opening 110a of the fluid chamber 110. The projection 22a has formed therein an opening 116 which is closed by a wall 118 having formed therein a restricted flow passage or passages 120. With this construction, the fluid chamber 28 of the hydropneumatic spring unit 20 communicates with the fluid chamber 110 formed in the cylinder head 14 through the restricted flow passage or passage 120. Indicated at 122 are one-way check valves which are mounted on both sides of the wall 118 to open and close the restricted flow passage or passages 120.

The operation of the hydropneumatic suspension unit shown in FIGS. 3 and 4 is similar to that of the unit of the first embodiment shown in FIGS. 1 and 2 with the exception that the hydraulic fluid from the upper compartment 12a of the cylinder chamber 12 is passed through the arcuate elongate passage or passages 112 and the fluid chamber 110 into the outlet passageway 68 and, therefore, the detailed description of the same is herein omitted for the sake of simplicity of description.

Figure 6:
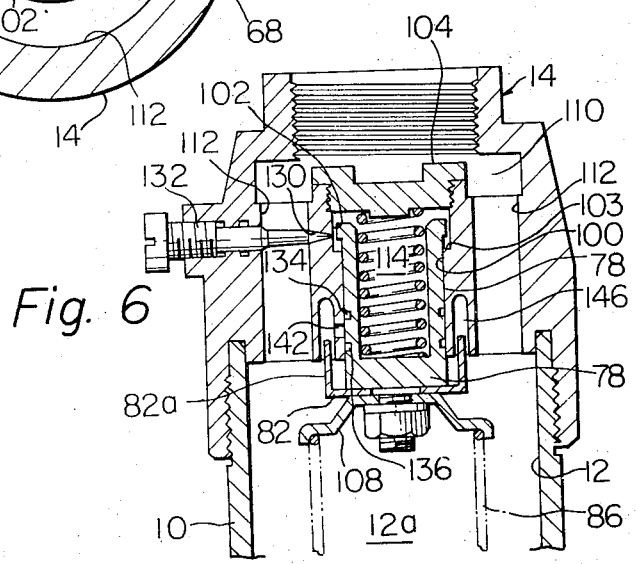
FIG. 6 is a sectional view taken on line VI — VI of FIG. 5.
Figure 5:
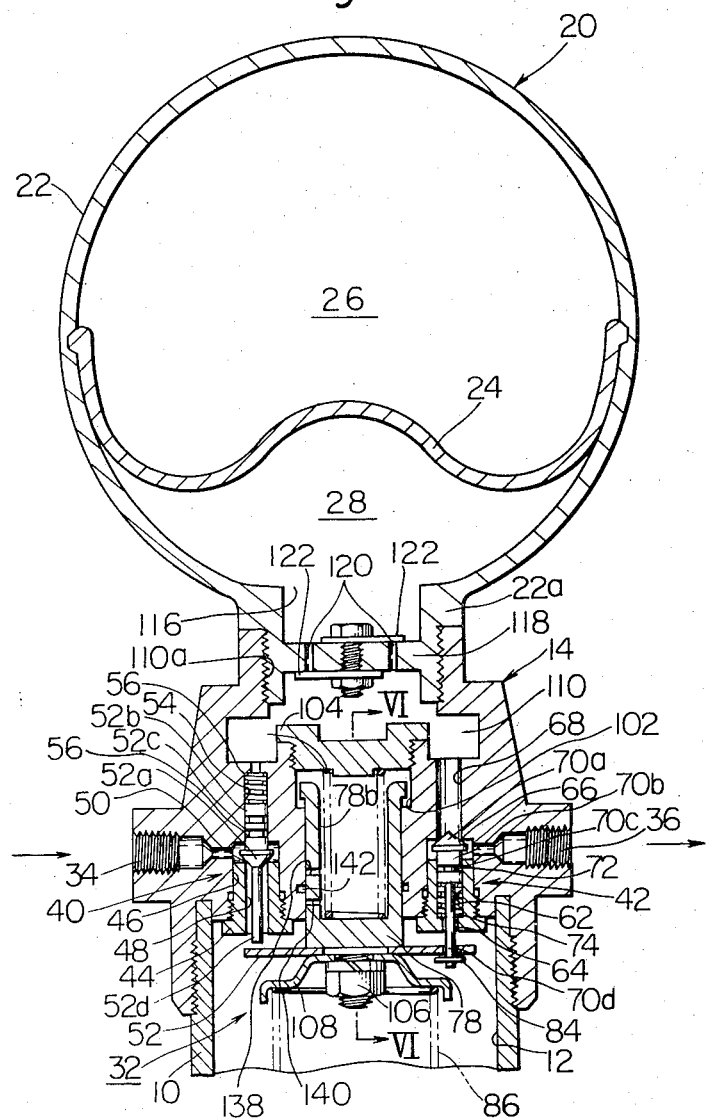
FIG. 5 is a cross-sectional view of still another preferred embodiment of a hydropneumatic suspension unit according to the present invention.

Still another preferred embodiment of the hydropneumatic suspension unit carrying out the present invention is illustrated in FIGS. 5 and 6 in which same reference numerals are assigned to like or corresponding component parts. The embodiment of FIGS. 5 and 6 is similar to that shown in FIGS. 3 and 4 with the exception that the restricted flow passage 104a formed in the end plug 104 is dispensed with and a port 130 is formed in the cylinder head 14 so as to provide fluid communication between the piston chamber 114 and the arcuate elongate passage 112. The port 130 opens to the axial bore 102. The effective cross-sectional area of the port 130 is adapted to be controlled by an adjusting screw 132 which is mounted in the cylinder head 14 for thereby controlling the flow rate of hydraulic fluid passing through the port 130.

In this illustrated embodiment, the floating piston 78 is formed at its outer circumference also with annular recesses 134 and 136, which is axially spaced from each other. The annular recesses 134 and 136 communicate with the piston chamber 114 through radially extending bores 138 and 140, respectively, which are formed in the floating piston 78. The annular recesses 134 and 136 are selectively brought into alignment with an inwardly facing annular recess 142 formed in the axial bore 100 of the cylinder head 14 when the floating piston 78 is moved to its first and second adjusting positions, respectively. As shown in FIG. 6, the inwardly facing annular recess 142 communicates with the upper compartment 12a of the cylinder chamber 12 through an axially extending bore or bores 146 formed in the cylinder head 14.

In the illustrated embodiment of FIGS. 5 and 6, the valve actuating member or the annular plate 82 is shown as having an axially extending flange portion or portions 82a which are inserted in the axially extending bore or bores 146. The flange portions 82a has a side wall (not shown) which is adapted to slide on an adjacent wall (not shown) of the axially extending bore 146 to prevent rotation of the floating piston 78 during operation of the vehicle level adjusting device 32.

When neither one of the annular recesses 134 and 136 is in alignment with the annular recess 142 formed in the axial bore 100, hydraulic fluid is passed into or out of the piston chamber 114 at a restricted flow rate through the port 130 which is restricted by the adjusting screw 132 so that the floating piston 78 slowly moves upwardly or downwardly and, therefore, the vehicle level adjusting device 32 slowly operates to adjust the effective length of the hydropneumatic suspension unit whereby the vehicle body is maintained at a substantially constant level even when the motor vehicle is travelling on an irregular road surface. When, however, either one of the annular recesses 134 and 136 is brought into alignment with the annular recess 142, hydraulic fluid is passed into or out of the piston chamber 114 through, in addition to the port 130, the bore 142 and, accordingly, the floating piston 78 is quickly movable to adjust the effective length of the hydropneumatic suspension unit. This is advantageous in that the floating piston is quickly movable only when the inlet and outlet valves 40 and 42 are opened or closed and, therefore, an excess amount of fluid supply or drain is prevented.

What is claimed is:

1. A hydropneumatic suspension unit adapted to be mounted between a wheel supporting means and a body of a wheeled vehicle for maintaining the vehicle body at a substantially constant level irrespective of weight and load of the vehicle, comprising a cylinder body having a cylinder chamber filled with hydraulic fluid under pressure, a cylinder head, an inlet passageway formed in said cylinder head and communicating with said cylinder chamber and a source of hydraulic fluid under pressure, an outlet passageway formed in said cylinder head and communicating with said cylinder chamber and a drain, inlet and outlet valve means including first and second poppet valves respectively, provided in said cylinder head parallel to each other and having first and second poppet valve heads axially movable in opposite directions to open and close said inlet and outlet passageways, respectively, each of said poppet valve heads being subjected to said hydraulic fluid under pressure from said cylinder chamber, a main piston slidably accommodated in said cylinder chamber and having a piston rod axially extending outwardly of said cylinder chamber, a floating piston disposed between said cylinder head and said main piston, a valve actuating means secured to said floating piston and movable therewith for actuating the poppet valves of said inlet and outlet valve means, respectively, said floating piston and said valve actuating means being axially movable to a first vehicle level adjusting position in which the first poppet valve head of said inlet valve means is moved to a position to open said inlet passageway and movable to a second vehicle level adjusting position in which the second poppet valve head of said outlet valve means is moved to a position to open said outlet passageway, and first and second biasing means acting on said floating piston for maintaining said floating piston and said valve actuating means in a neutral position in which the first and second poppet valve heads of said inlet and outlet valve means are held in positions to close said inlet and outlet passageways, respectively, when said vehicle body is maintained at a predetermined level relative to ground.

2. A hydropneumatic suspension unit as claimed in claim 1, in which the first valve head of the first poppet valve of said inlet valve means is conical and engageable with a first valve seat formed on a first sleeve mounted in said cylinder head, a first stem portion projecting in one direction from said first valve head and slidably received in an axially extending first bore formed in said cylinder head, said axially extending first bore being in constant fluid communication with said cylinder chamber, and a push rod projecting in an opposite direction, from said first valve head and movable by said valve actuating means to cause said first valve head to disengage said first valve seat when said floating piston is moved to said first vehicle level adjusting position, said push rod extending through an inlet passage formed in said sleeve, and said inlet passage intervening between said inlet passageway and said cylinder member and being in constant fluid communication with said cylinder chamber.

3. A hydropneumatic suspension unit as claimed in claim 2, in which the second valve head of the second poppet valve of said outlet valve means is conical and engageable with a second valve seat formed at a circumferential edge of an outlet passage formed in said cylinder head, said outlet passage intervening between said outlet passageway and said cylinder chamber and being in constant fluid communication with said cylinder chamber, a second stem portion projecting in one direction from said second conical valve head and slidably received in an axially extending second bore formed in a second sleeve mounted in said cylinder head, said axially extending second bore of said second sleeve being in constant fluid communication with said cylinder chamber, and a pull rod projecting in an opposite direction from said second valve head and movabble by said valve actuating means to cause said second conical valve head to disengage said second valve seat when said floating piston is moved to said second vehicle level adjusting position.

4. A hydropneumatic suspension unit as claimed in claim 3, in which said floating piston has formed therein a restricted flow passage.

5. A hydropneumatic suspension unit as claimed in claim 4, in which said floating piston is slidably received in said cylinder chamber.

6. A hydropneumatic suspension unit as claimed in claim 5, further comprising a hydropneumatic spring unit having a casing which is divided by a flexible partition member into a gas chamber filled with a gas under pressure and a first fluid chamber communicating with said cylinder chamber.

7. A hydropneumatic suspension unit as claimed in claim 3, in which said floating piston is slidably received in an axially extending bore formed parallel to said inlet and outlet valves in said cylinder head.

8. A hydropneumatic suspension unit as claimed in claim 7, further comprising an end plug mounted in said cylinder head to close an upper end of said last-mentioned axially extending bore, said end plug and said floating piston defining a second fluid chamber therebetween in said last-mentioned axially extending bore.

9. A hydropneumatic suspension unit as claimed in claim 8, further comprising a third fluid chamber formed in said cylinder head and communicating with said cylinder chamber through at least one arcuate elongate passage formed in said cylinder head.

10. A hydropneumatic suspension unit as claimed in claim 9, in which said end plug had formed therein a restricted flow passage which provides fluid communication between said piston chamber and said third fluid chamber.

11. A hydropneumatic suspension unit as claimed in claim 10, further comprising a hydropneumatic spring unit having a casing which is divided by a flexible partition member into a gas chamber filled with a gas under pressure and a first fluid chamber communicating with said third fluid chamber formed in said cylinder head.

12. A hydropneumatic suspension unit as claimed in claim 9, in which said cylinder head has formed therein a port which provides fluid communication between said piston chamber and said arcuate elongate passage, the effective cross-sectional area of said port being adjustable by an adjusting screw mounted in said cylinder head.

13. A hydropneumatic suspension unit as claimed in claim 12, in which said floating piston has first and second axially spaced annular recesses formed at the outer periphery at said floating piston and radial bores formed to extend to said first and second annular recesses of said floating piston, respectively, and communicating with said piston chamber, and in which said last-mentioned axially extending bore has a third annular recess at its inner periphery, said third annular recess communicating with said cylinder chamber, said first and second annular recesses of said floating piston, being in alignment with said third annular recess of said last-mentioned axially extending bore when said floating piston is moved to said first and second vehicle level adjusting positions.

* * * * *